United States Patent [19]

Lo

[11] Patent Number: 5,583,971
[45] Date of Patent: Dec. 10, 1996

[54] FILMLESS METHOD AND APPARATUS FOR PRODUCING 3-D PHOTOGRAPHS

[75] Inventor: Allen K. Lo, Dunwoody, Ga.

[73] Assignee: Image Technology International, Inc., Norcross, Ga.

[21] Appl. No.: 333,201

[22] Filed: Nov. 2, 1994

Related U.S. Application Data

[63] Continuation-in-part of Ser. No. 1,025, Jan. 9, 1993, abandoned.

[51] Int. Cl.⁶ ................................................. G06K 15/00
[52] U.S. Cl. ............................................. 395/117; 355/22
[58] Field of Search ...................................... 395/101, 102, 395/104, 117, 119, 112, 125, 127; 353/8; 352/57, 58, 60; 346/134, 139 R, 139 C; 250/558; 356/2; 355/22

[56] References Cited

U.S. PATENT DOCUMENTS

| | | |
|---|---|---|
| 2,472,259 | 6/1949 | McPherson . |
| 2,912,488 | 11/1959 | Smith et al. . |
| 3,109,057 | 10/1963 | Slavecki et al. . |
| 3,688,045 | 8/1972 | Ohkoshi . |
| 3,895,867 | 7/1975 | Lo et al. . |
| 3,953,869 | 4/1976 | Lo et al. . |
| 4,101,210 | 7/1978 | Lo et al. . |
| 4,120,562 | 10/1978 | Lo et al. . |
| 4,132,468 | 1/1979 | Lo et al. . |
| 4,468,115 | 8/1984 | Lao . |
| 4,506,296 | 3/1985 | Marraud et al. . |
| 4,807,024 | 2/1989 | McLaurin et al. .......................... 358/88 |
| 4,893,898 | 1/1990 | Beard ....................................... 350/132 |
| 4,903,069 | 2/1990 | Lam . |
| 5,028,750 | 7/1991 | Fritsch . |
| 5,036,356 | 7/1991 | Lo . |
| 5,127,037 | 6/1992 | Bynum . |
| 5,255,054 | 10/1993 | Tsai . |

*Primary Examiner*—Arthur G. Evans
*Attorney, Agent, or Firm*—Deveau, Colton & Marquis

[57] ABSTRACT

A filmless 3D printing method for producing 3D photographs on lenticular print material. The 3D photograph is composed of a series of 2D images of a scene acquired by a video camera and displayed on a video monitor screen. During printing, the projection lens and the print material are moved to different positions to change the projection angles and fill the lenticules with compressed images. While the video camera is moved in relation to the scene to acquire 2D images, it aims at the key subject of the scene at all times so that the location of key subject image on the images displayed on the screen is always the same. Thus, the 2D images exposed on the print material are automatically aligned. The 2D images of a scene at different viewing angles can also be generated on a computer.

24 Claims, 9 Drawing Sheets

FILMLESS METHOD AND APPARATUS FOR PRODUCING 3-D PHOTOGRAPHS

This application is a continuation-in-part of my earlier filed application Ser. No. 08/001,025, filed Jan. 9, 1993, abandoned.

BACKGROUND OF THE INVENTION

This invention is, in general, related to the field of 3D photography, and more specifically related to a 3D photographic printing method for producing 3D pictures on lenticular print material.

PRIOR ART

Figure 1:
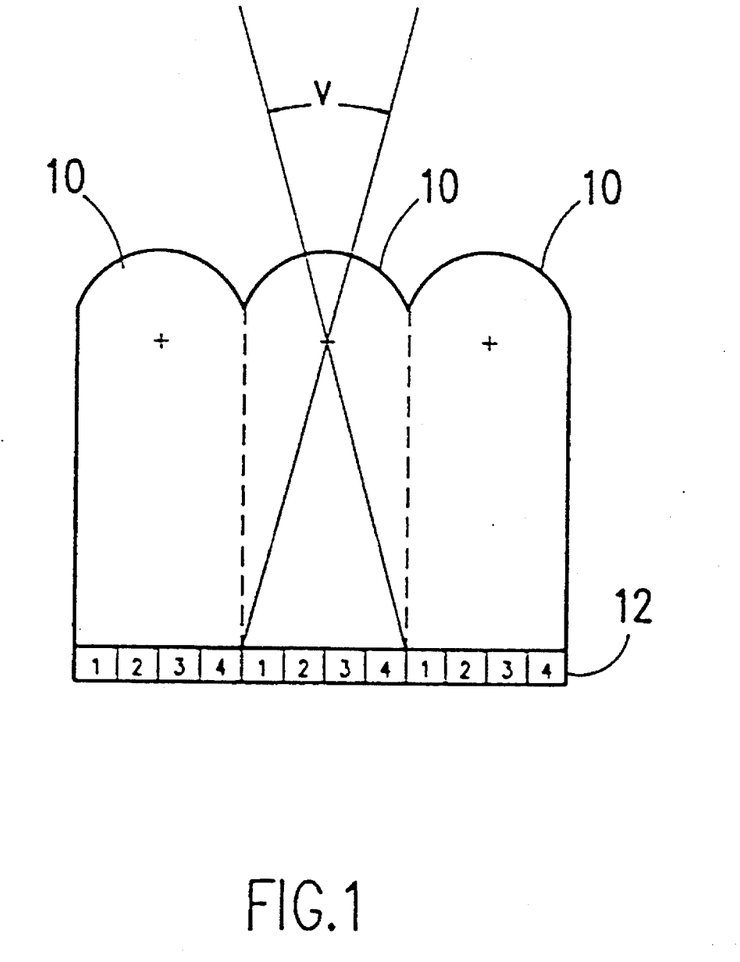
FIG. 1 illustrates a cross section of lenticular print material showing three lenticules and the photographic emulsion layer below.

In lenticular 3D photograph, the basis process involves taking a series of 2D images of the views of a scene at different horizontally-spaced vantage points, or viewing angles, and exposing these 2D images onto a lenticular print material. In the exposing process, each 2D image is projected at a different angle so that the projected image on the lenticular material is compressed to fill a certain portion of the lenticules. As shown in FIG. 1, four 2D images are projected at different angles to properly fill the lenticules. Furthermore, the projected 2D images must be properly aligned to produce an in-focus 3D photograph. Due to the fact that all the 2D images of the same scene are slightly different from each other, a certain object in the scene must be chosen as the registration point. The chosen object is called the key-subject, and the alignment process is usually referred to as the key-subject alignment.

Various techniques for exposing a series of 2D images onto lenticular print material have been disclosed in past. U.S. Pat. No. 4,120,562 (Lo et al.) discloses a scanning method which uses an apparatus for changing the projection angles to properly fill the lenticules. U.S. Pat. No. 5,028,950 (Fritsch) discloses a dual-stage printer comprising an editing station and a printing station. In this dual-stage printer, the key subject locations in the 2D image frames are determined in the editing station while the exposing is carried out in the printing station. U.S. Pat. No. 5,036,356 (Lo) discloses a multi-lens camera preloaded with a roll of film on which a set of target images are exposed to assist key subject alignment.

Presently, to order to produce a 3D picture, it is necessary to take a series of 2D images and record these images on film. For practical reasons, only a very limited number of 2D image frames recorded on film are used to make a 3D picture. More importantly, in order to maintain a proper parallax on the 3D image, only the views within a certain angular range may be used. Thus, the number of taking lenses placed on a multi-lens, and the number of 2D image frames taken thereby, must be small, typically less than 5. A 3D picture made from a small number of 2D images will appear somewhat "jumpy". Furthermore, when the 2D images recorded on film are used to make a 3D picture, key subject alignment is very complex because the exact location of the key subject on each image frame is usually unpredictable. For this reason, key subject alignment is a major challenge in most existing 3D printing methods.

It is desirable to produce a 3D picture with a large number of 2D frames so that the 3D image will look continuous. More importantly, it is advantageous to use a 3D printing method where the key subject alignment process can be completely eliminated.

SUMMARY OF THE INVENTION

Briefly described, the filmless 3D printing method according to the present invention, a series of 2D images of a scene are captured electronically and sequentially displayed on a video monitor screen. The displayed images are exposed through a projection lens onto a lenticular print material at different projection angles. The means for capturing the 2D views may be a video camera or computer generated, which generates the 2D views, or a combination thereof.

Before the 2D images are conveyed to the video monitor, however, they may be converted into mirror images and their color corrected to suit the optical characteristics of the print material. In order to expose the 2D images at different projection angles to fill all the lenticules with compressed images, the projection lens and the prim material must be moved to different positions. At all times, the print material is maintained substantially parallel to the monitor screen, and the projection lens is maintained to properly focus on the monitor screen and the print material. The video monitor may be used in a vertical or a horizontal position. Moreover, in order to minimize possible moire effect produced on the 3D photograph, it may be necessary to tilt the video monitor by a certain angle from a vertical or horizontal position while maintaining the screen substantially parallel to the print material. It is understood that the moving direction of the projection lens and the print material is perpendicular to the length of the lenticules. Furthermore, while the video camera is moved around the photographed scene to acquire 2D images at different viewing angle, it keeps aiming at the key subject in the scene. When 2D images are acquired in that fashion, even though the 2D images displayed on the monitor screen are constantly changing, the key subject image remains at the same location. Consequently, key subject alignment can be completely eliminated. Because there is no need to determine the key subject locations prior to exposing, any 3D printer that uses this filmless printing method does not require a separate editing station. Thus, the filmless 3D printing method, according to the present invention, is inherently a single-stage printing method.

The 2D images of a scene can also be generated by a computer and directly conveyed to a video monitor for displaying and exposing. The 2D images acquired by a video camera or generated by a computer may be stored in a storage medium and then later retrieved for printing. Moreover, the transfer of images can be achieved by using modems or similar telecommunication devices so that images produces at one location can be printed at other locations in real-times.

It should be noted that, using 2D images acquired by a video camera or generated by a computer, the angular difference between any two sequentially displayed 2D images can be made infinitesimally small. Thus, a 3D picture produced by this filmless printing method can be composed of a very large number of 2D image frames and can still have a proper parallax. Consequently, the image on a 3D picture produced by these film printing methods will look continuous and not "jumpy" as image appears on a 3D photograph made from a small 2D image taken by multi-lens camera and recorded on the film.

It is an objective of the present invention to provide a method for producing 3D pictures composed of a large number of 2D images taken at different viewing angles.

It is another objective of the present invention to provide a method for producing 3D pictures wherein the key subject alignment process is effectively eliminated.

It is yet another objective of the present invention to provide a method and apparatus for producing 3D pictures without using photograph film as an image recording medium.

These and other objectives, features, and advantages of the present invention will become apparent upon reading the following specification in conjunction with the accompany drawing figures.

DETAILED DESCRIPTION OF THE INVENTION

FIG. 1 illustrates a cross section of lenticular print material showing three lenticules each of which is denoted by reference numeral 10. The photographic emulsion layer coated on the backside of the print material is denoted by numeral 12. The emulsion area under each lenticule is shown to have been exposed with four 2D images, as indicated by numerals 1 to 4, each exposed at a different projection angle. The total viewing angle of the lenticule is denoted by letter V.

Figure 2:
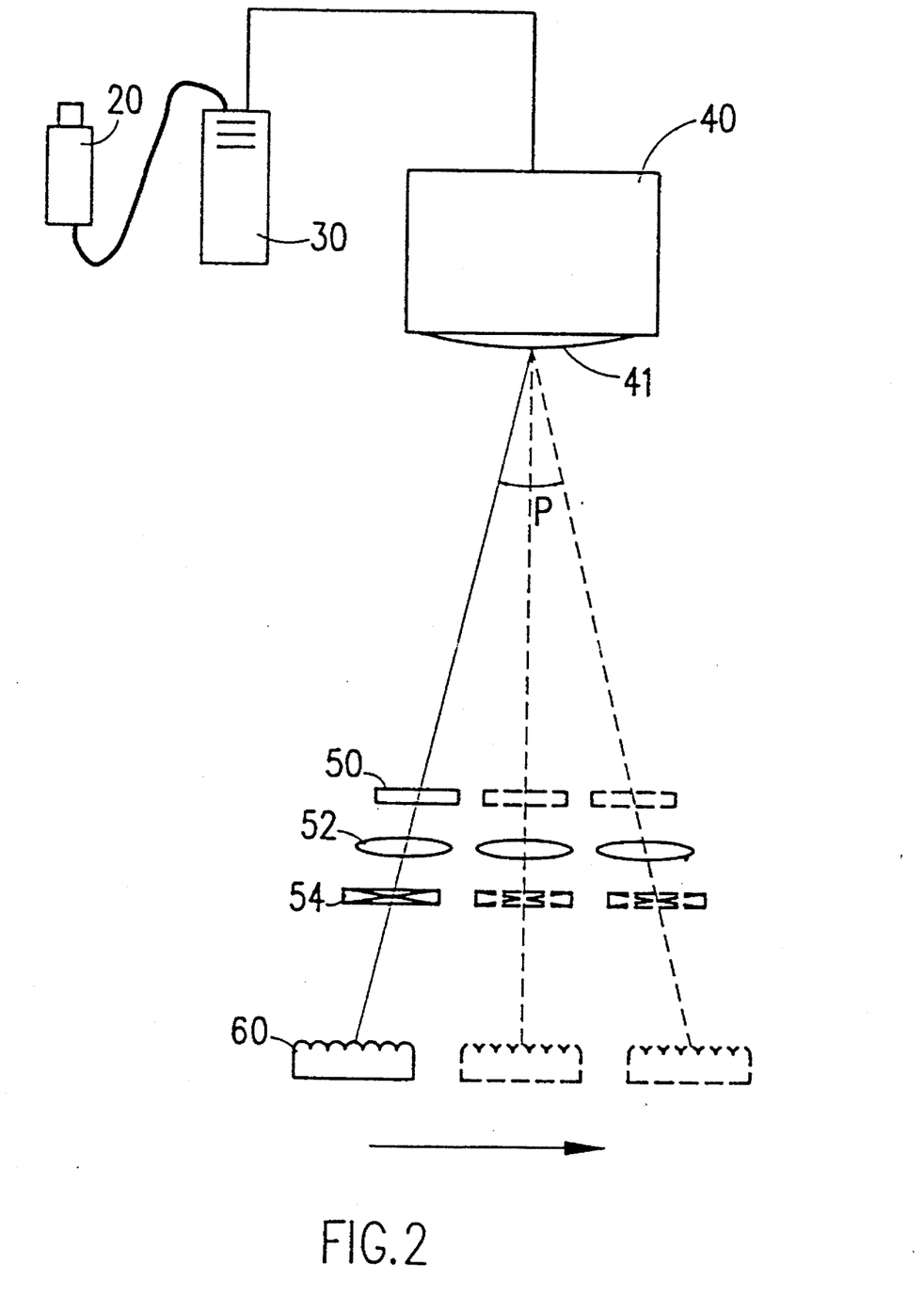
FIG. 2 is a schematic representation of the first and preferred embodiment of the filmless single-stage 3D printer, wherein a video camera is used to acquire a series of 2D images of a scene and the acquired 2D images are directly transferred for priming.

FIG. 2 is a schematic representation of the first and preferred embodiment of the filmless single-stage 3D printer for making 3D photographs, according to the present invention. In FIG. 2, numeral 20 denotes a video camera for acquiring a series of 2D images of a scene at different angles, the acquired 2D images are electronically transferred to an image processing device 30 which processes the 2D images before electronically conveying them to a single video monitor 40 for display. The processed 2D images are sequentially displayed, one at a time, on monitor screen 41, so that 2D images can be exposed onto lenticular print material 60 through color filter 50, projection lens 52 and shutter 54. The color filter 50 is used to obtain the desired color characteristics of the 3D photographs. The print material is substantially parallel to monitor screen 41. Image processing device 30, if necessary, converts the acquired 2D images into mirror images and corrects the image color to suit the optical characteristics of print material 60. In order to fill the photographic emulsion layer 12 under each lenticule 10 with different compressed 2D images, the group of elements comprising the filter 50, the projection lens 52, the shutter 54 and the print material 60 must be laterally moved by moving means to different positions to change the projection angles for exposure. In all times, projection lens 52 is properly focused on monitor screen 41 and on print material 60 at a desired location. The range of projection angles during exposure is controlled by properly opening and closing shutter 54 such that projection angle P is substantially equal to viewing angle V of the lenticules shown in FIG. 1. Video camera 20 may also be directly linked to video monitor 40 so that image processing device 30 may be omitted. Video camera 20 may be a color camera or a black-and-white camera. Video monitor 40 may be a color monitor or a black-and-white monitor.

Figure 3:
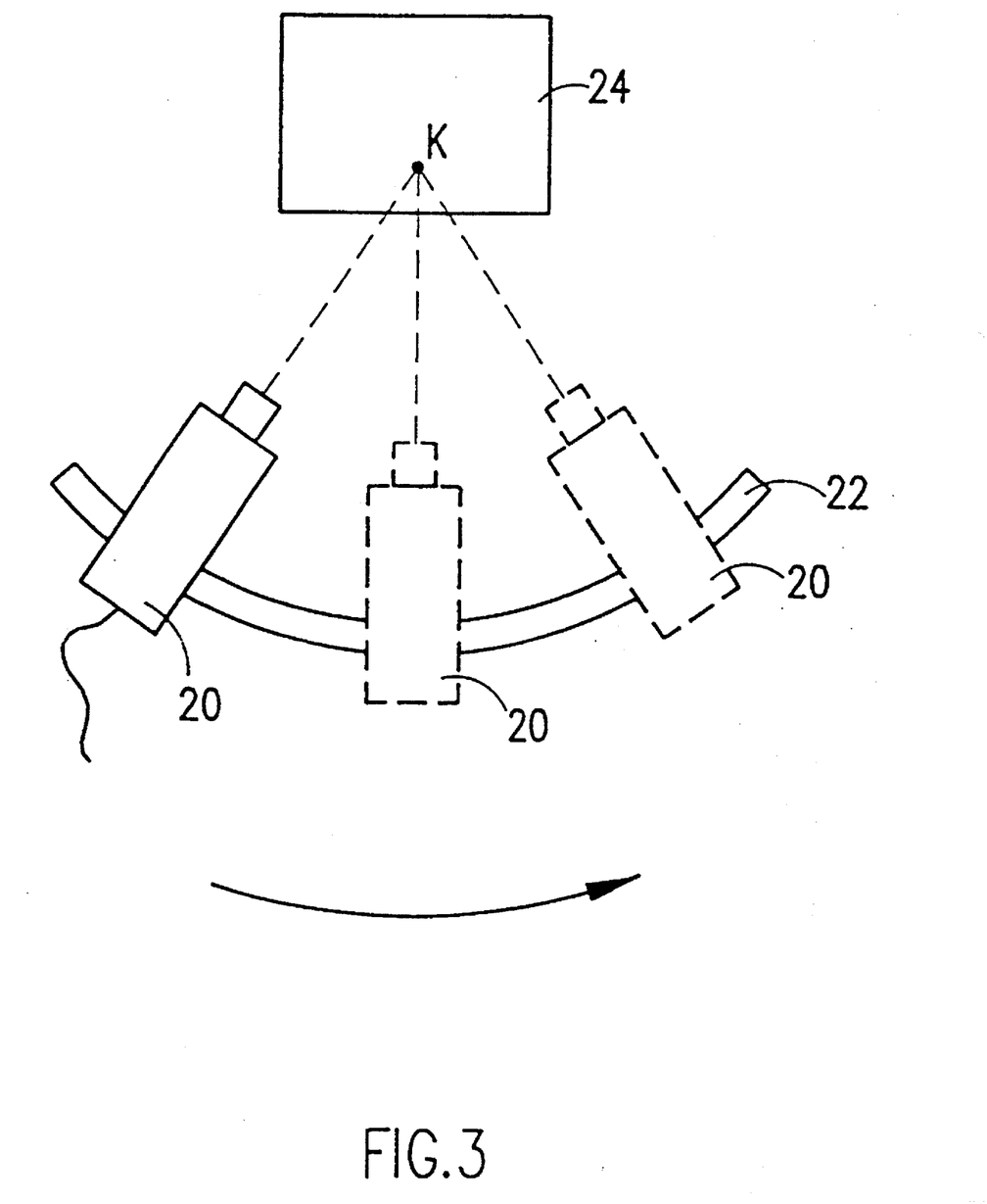
FIG. 3 shows a video camera being moved around a stationary scene to acquire 2D images of the scene at different viewing angles.

FIG. 3 shows a video camera 20 being moved around a stationary scene 24 to acquire 2D images of the scene. As shown in FIG. 3, video camera 20 is moved along a circular track 22 to acquire a series of 2D images of the views of scene 24 at different viewing angles. The video camera 20 aims at a point, or an object, K while acquiring the 2D images. The aimed-at object, generally known as the key subject in 3D photography, is a registration point upon which all the 2D images projected on the lenticular print material are aligned. With this setup, even though the 2D images displayed on monitor screen 41 are constantly changing as video camera 20 acquires images of different views, the image of point K remains at the same location on monitor screen in the entire exposing process. Consequently, the 2D images projected on the print material 60 are always properly aligned. In other words, the key subject alignment is automatic. It is understood that track 22 may also be a straight track or a curved track capable or providing the proper aiming of video camera 20.

The movement of video camera 20 on track 22 can be intermittent to allow the video camera to acquire a series of 2D images in a discrete sequence. Alternatively, the movement is continuous to allow the video camera to acquire a series of 2D images in a continuous sequence.

Figures 4, 5:
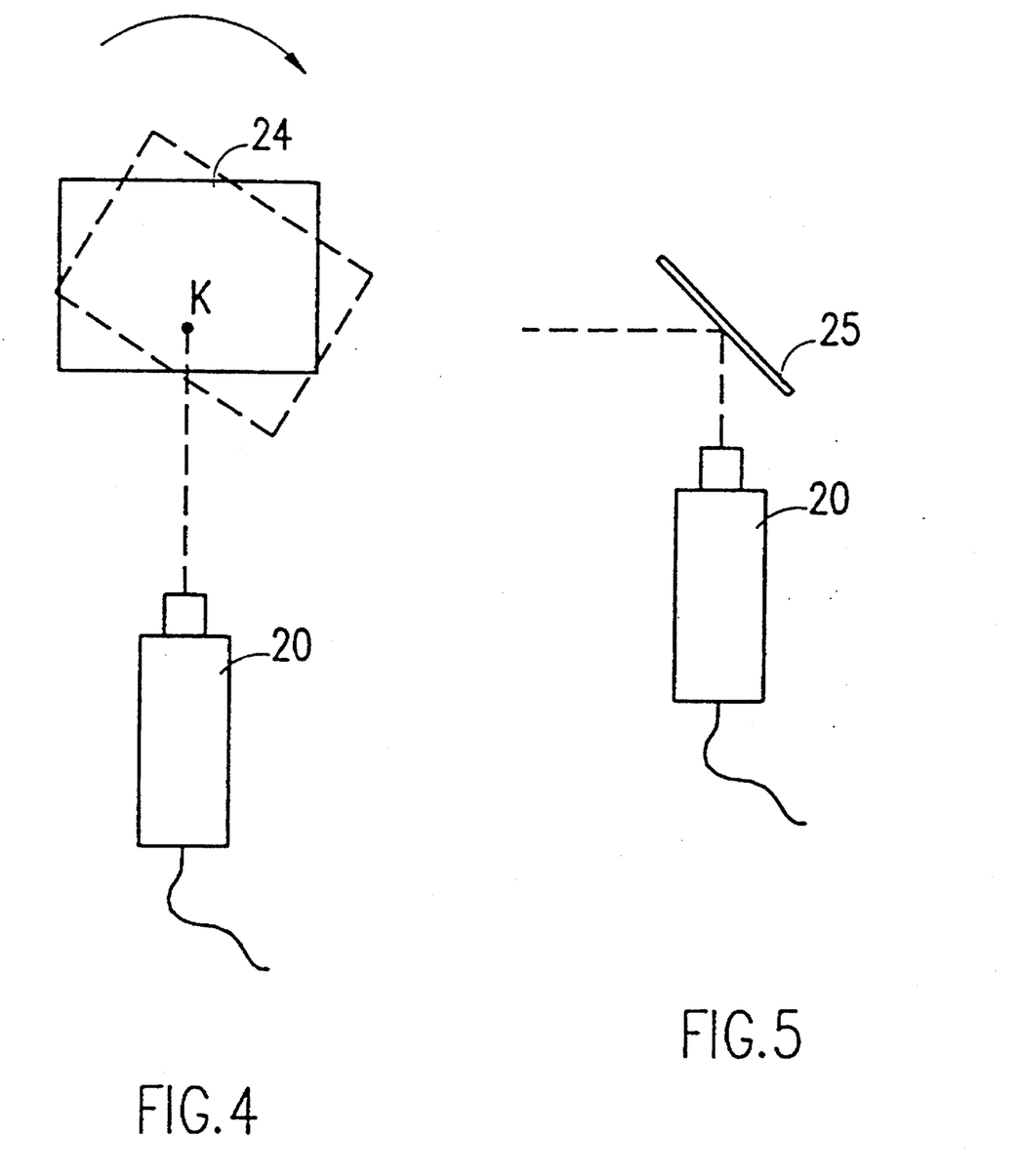
FIG. 4 shows a stationary video camera being used to acquire 2D images of a rotating scene at different viewing angles.
FIG. 5 shows a video camera being used to acquire 2D images of a scene through a plane mirror.

FIG. 4 shows a stationary video camera being used to acquire 2D images of a rotating scene 24. As shown in FIG. 4, while video camera 20 is kept stationary, the scene 24 is rotated around a point K which is also aimed at by the video camera for maintaining proper registration. Like the configuration shown in FIG. 3, the scene can be rotated intermittently or continuously.

FIG. 5 shows video camera 20 acquiring 2D images through a plane mirror 25. In this way, the acquired 2D images are optically converted into mirror images.

Figure 6:
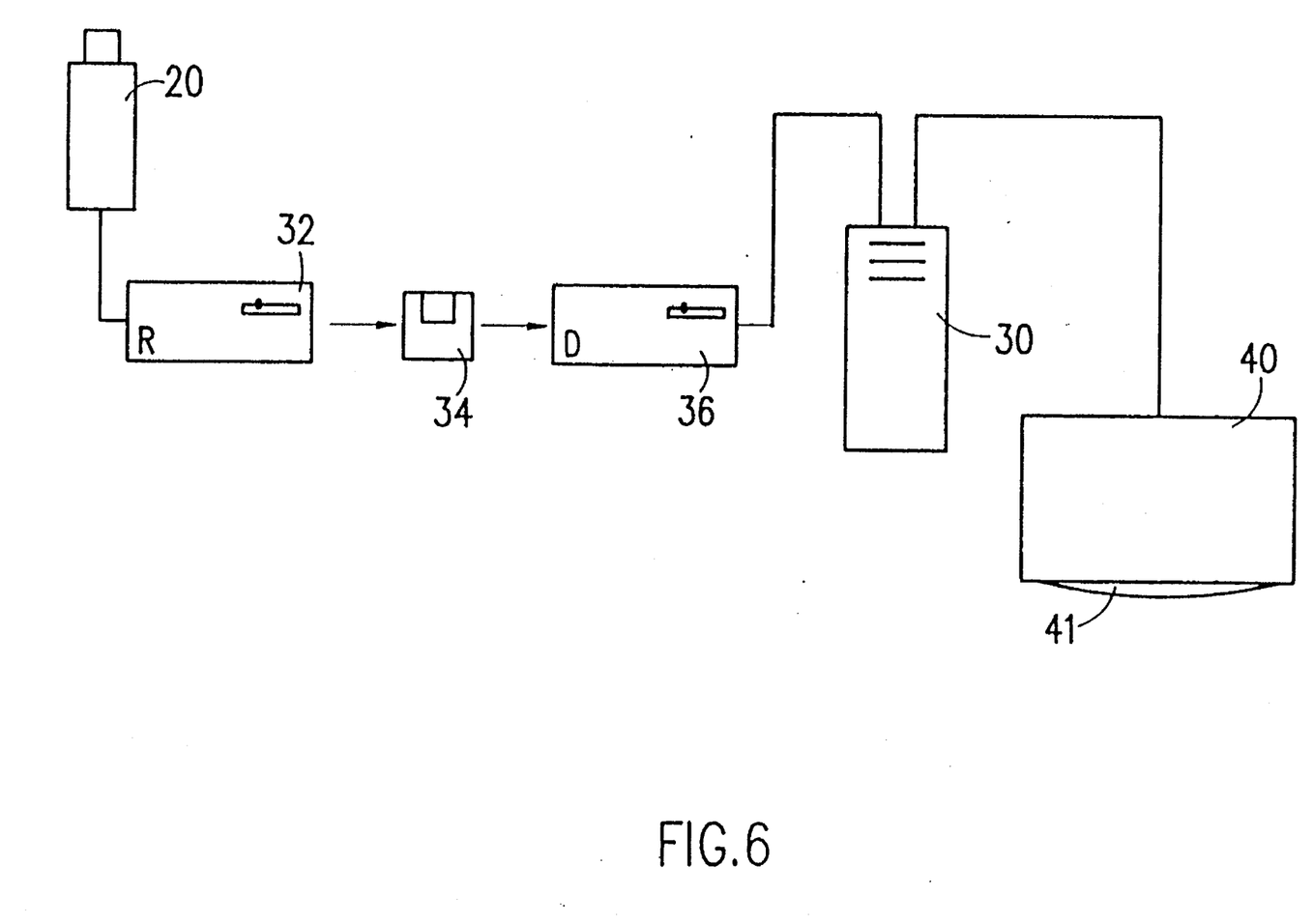
FIG. 6 shows a modified form of the first preferred embodiment, wherein the 2D images acquired by the video camera are stored in a storage device so that these 2D images can be retrieved for printing at a later time.

FIG. 6 shows a modified form of the first preferred embodiment shown in FIG. 2. In FIG. 6, the 2D images acquired by video camera 20 are electronically transferred to a recording device 32 and stored, in a storage medium 34.

The stored 2D images can be later retrieved by a retrieving device 36 and then transferred to image processing device 30. With this setup, the acquisition of images and the printing of a 3D photograph do not need to be carried out simultaneously. Moreover, the acquisition and the printing can be carried out at different locations.

The storage medium 34 can be a magnetic tape, a magnetic disk, a magnetic card or a photo-CD. Depending on the nature of storage medium 24, recording device 32 and retrieving device 36 each can be a magnetic tape drive, a magnetic disk drive, a magnetic card reader or a photo-CD drive.

The 2D images can be conveyed via a data transmitter to a data receiver (not shown) or by other suitable electronic means.

Figure 7:
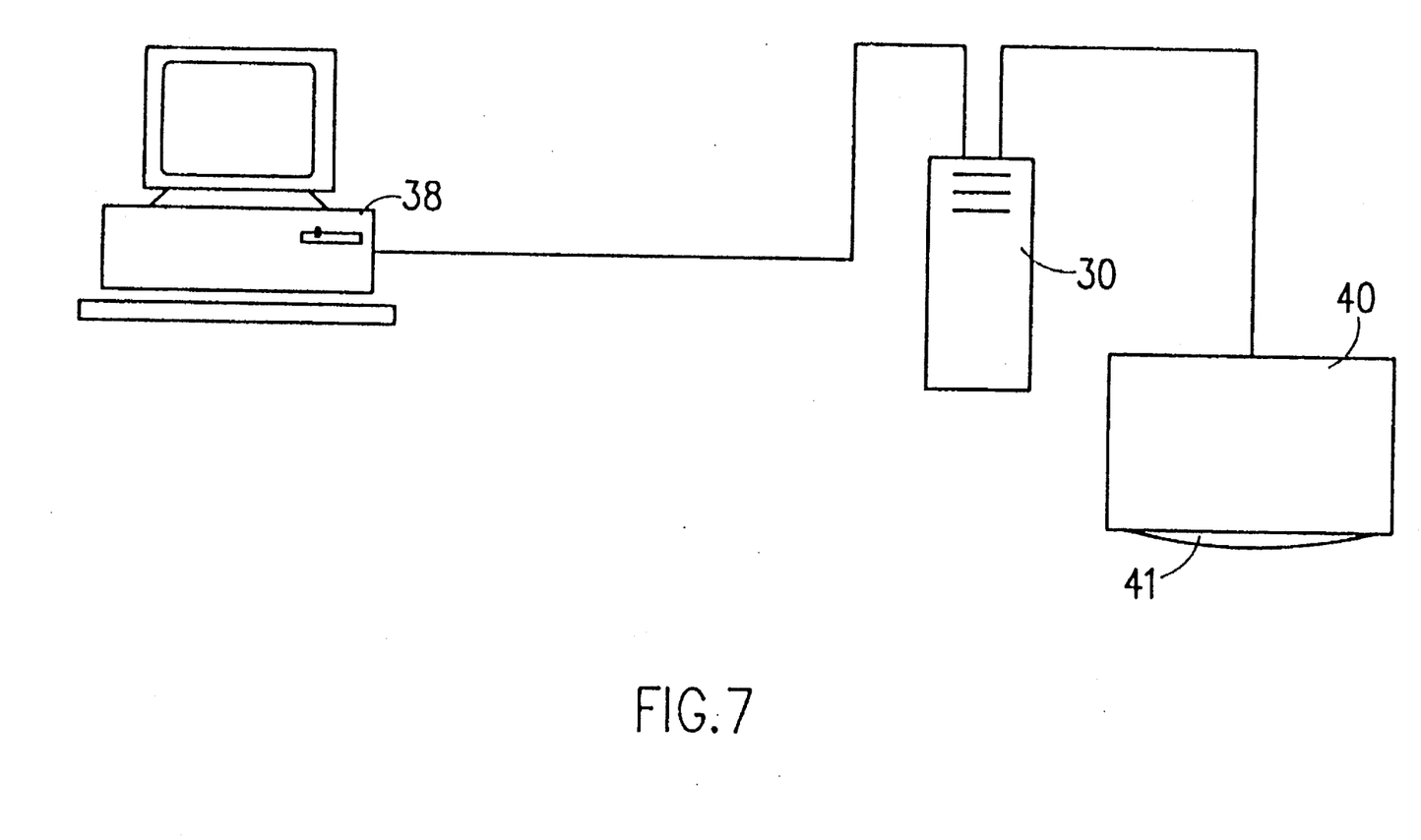
FIG. 7 illustrates the second embodiment of the filmless single-stage 3D printer, wherein the 2D images of a scene at different viewing angles are generated by a computer and the generated 2D images are directly transferred for printing.

FIG. 7 illustrates the second embodiment of the filmless single-stage 3D printer, according to the present invention. As shown in FIG. 7, 2D images of a scene at different viewing angles are generated by a computer 38 which electronically transfers the generated images to image processing device 30. In the generated 2D images, a point or an object in the scene is chosen as the key subject such that the key subject image is kept at exactly the same location in all 2D image frames to maintain proper registration during printing. The computer 38 may be linked directly to video monitor 40 so that image processing device 30 may be omitted.

Figure 8:
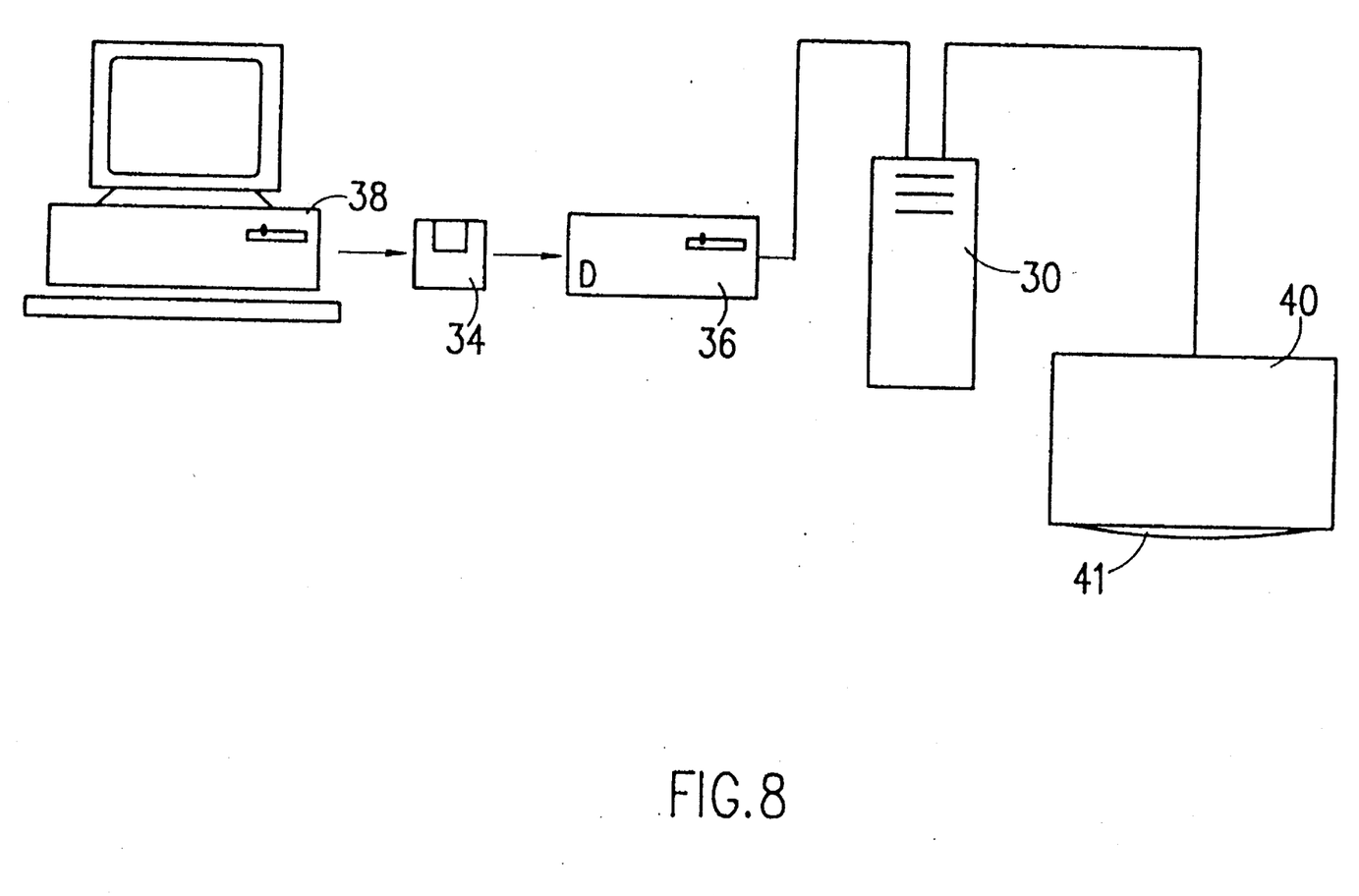
FIG. 8 illustrates a modified form of the second preferred embodiment of the filmless 3D printer, wherein the 2D images generated by the computer are stored in a storage device so that the 2D images can be retrieved for printing at a later time.

FIG. 8 illustrated a modified form of the second preferred embodiment shown in FIG. 7. As shown in FIG. 8, the 2D images generated by computer 38 are stored in storage medium 34. The stored images can be later retrieved by a retrieving device 36 and conveyed to the image processing device 30.

Figure 9:
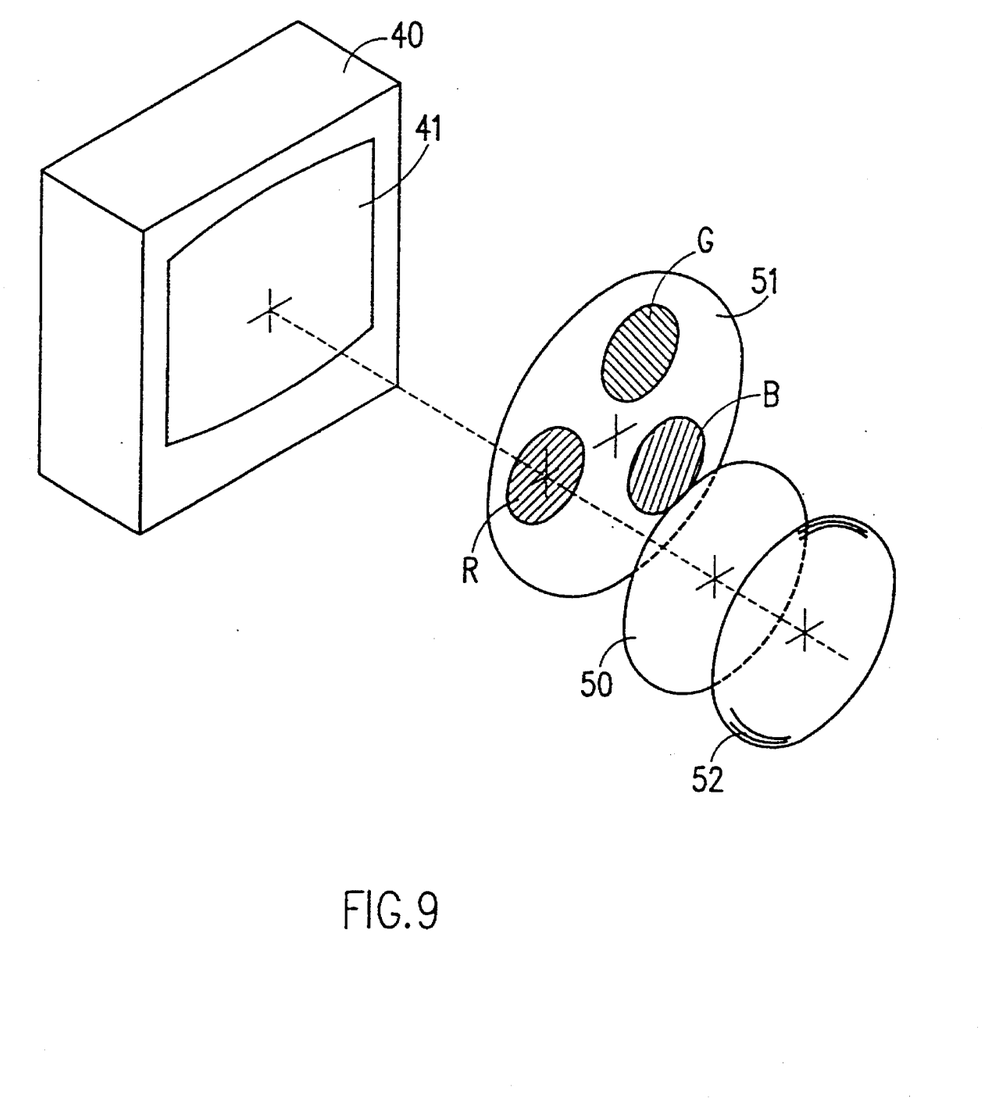
FIG. 9 shows a filter assembly comprising three separate color filters for sequentially exposing each 2D image in three color component images.

It is preferred that monitor 40 be a color monitor for displaying color 2D images and producing color 3D photographs. However, it is possible to use a black-and-white monitor to produce a color 3D photograph by sequentially displaying three color component images, separately in red, green and blue, for each view of the scene, and filter the component images through a color filter assembly 51 in addition to filter components 50, as shown in FIG. 9. As shown in FIG. 9, color filter assembly 51 contains three separate color filters R, G and B of primary colors red, green and blue and each filter is used to filter the respective color component image displayed on monitor screen 41 during printing.

A combination of images acquired by a video camera and computer generated images can be utilized to print 3D photographs. The images generated by a computer 38 are electronically transferred to an image processing device 30. The 2D views acquired by a video camera 20 are also electronically transferred to the image processing device 30. The computer generated images and images acquired by the video camera 20 are arranged in the desired sequence, configuration and location and electronically transmitted to the video monitor 40 for printing on lenticular print film 60.

Figure 10A:
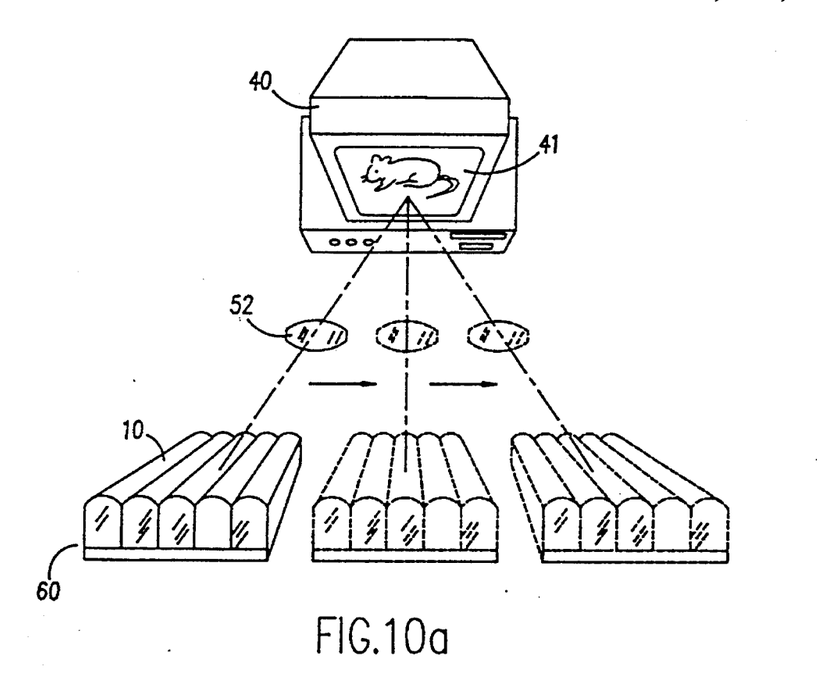
FIG. 10a shows the longitudinal axes of the lenticules of the print material being parallel to the vertical axis of a scene.

It should be noted that the orientation of a scene relative to the lenticules of the print material can be arranged in two different ways. FIG. 10a shows the longitudinal axes of the lenticules of the print material being parallel to the vertical axis of a scene in a normal sense. In FIG. 10a, the longitudinal axes of the lenticules 10 of print material 60 is parallel to the vertical axis of the scene displayed on screen 41 on video monitor 40. Accordingly, the moving direction of projection lens 52 and print material 60 is parallel to the horizontal axis of the scene.

Figure 10B:
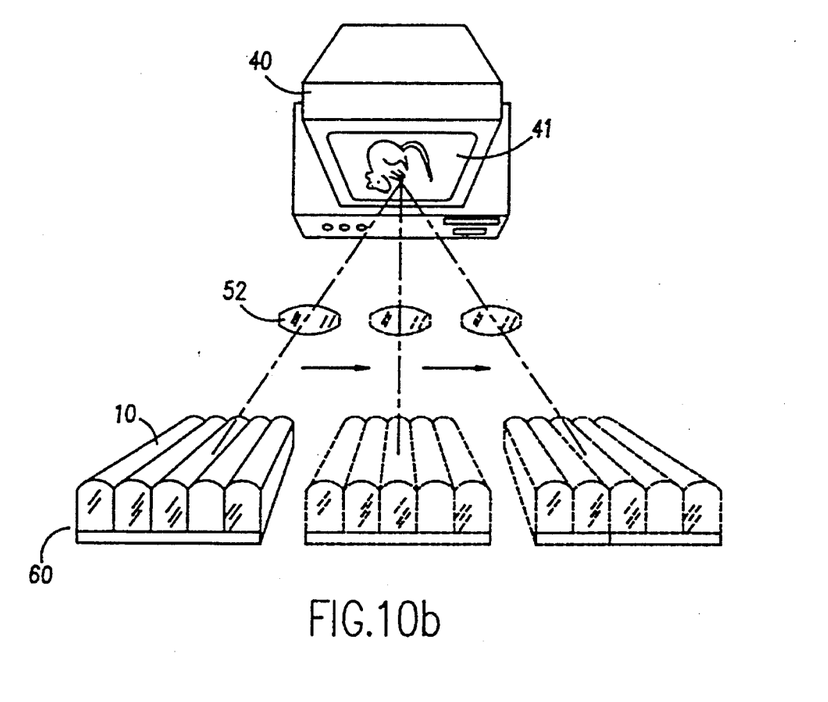
FIG. 10b shows the transverse axis of the lenticules of the print material being parallel to the vertical axis of a scene.

In contrast, in FIG. 10b, the transverse axis of the lenticules 10 of print material 60 is parallel to the vertical axis of the scene displayed on monitor screen 41 of video monitor 40. Accordingly, the moving direction of projection lens 52 and print material 60 is parallel to the vertical axis of the scene. The 3D picture made in this fashion normally will be viewed with the lenticules of the picture being in the horizontal direction.

In both FIG. 10a and FIG. 10b, the displayed scenes can be photographed by a video camera or generated by a computer, or a combination of photographed and computer generated scenes. Furthermore, the displayed images on monitor screen 41 for making a 3D picture may change from one scene to another while projection lens 52 and print material 60 are laterally moved from one projection angle to another. With such a 3D picture, a viewer can see many different scenes or objects depending on the viewing angles. Similarly, the displayed images on monitor screen 41 for making a 3D picture may be animated objects in different postures or facial expressions as the projection lens 52 and the print material 60 are laterally moved to different projection angles.

While the present invention has been disclosed in preferred forms, it will be obvious to those skilled in the art that many modifications, additions, and deletions can be made therein without departing from the scope of the invention as set forth in the appended claims.

What is claimed is:

1. A filmless single-stage printing method for printing 3D photographs from a plurality of electronically captured 2D images of views of a scene from different viewing angles on lenticular print material having a multiplicity of lenticules, each lenticule having a longitudinal axis and a transverse axis, said method comprising the steps of:

a) electronically capturing the 2D images of said scene by electronic capturing means, said capturing being performed so as to acquire 2D images of a scene at different viewing angles and to automatically maintain said scene in proper registration for subsequent printing of 3D photographs;

b) electronically conveying said captured 2D images by electronic conveying means to a single video monitor with a screen for sequentially displaying said 2D images on said screen, and maintaining them in proper registration on said screen;

c) projecting said displayed 2D images for exposing said 2D images onto lenticular pit material through a projection lens which is focused on said screen and at the desired locations on said print material; and d) moving the group of elements comprising (i) said projection lens and (ii) said lenticular print material in the same direction to different positions in relation to said screen of said video monitor for exposing said displayed 2D images onto said lenticular print material at the desired locations at different projection angles while maintaining said projection lens in proper focus on said screen and said lenticular print material, said moving direction being perpendicular to the Longitudinal axes of the lenticules of said lenticular print material.

2. The filmless single-stage priming method of claim 1 in which the plurality of 2D views of a scene is electronically captured in step (a) by aiming a video camera at an object in a scene which it is desired to print onto a 3D photograph, said aiming being performed to keep the object in proper registration for subsequent printing of the 3D photograph, said video camera acquiring 2D images of a scene at different viewing angles by moving said video camera relative to the object while said video camera is being aimed at said object, said aiming and relative moving of said video camera automatically maintaining the object in proper registration.

3. The filmless single-stage printing method of claim 1, in which the 2D images being projected in step (c) onto the lenticular film are filtered by a plurality of color filters in order to achieve the desired color characteristics of the photograph.

4. The filmless single-stage printing method of claim 2, wherein the plurality of 2D images of said views captured by the video camera are electronically conveyed to an image processing device for processing said 2D images and thereafter electronically conveying in step (b) the processed 2D image to a single video monitor with a screen for sequentially displaying the processed 2D images on said screen.

5. The filmless single-stage printing method of claim 4, which further comprises storing the captured 2D images acquired by the video camera in an electronic storage device and retrieving said 2D images with retrieving means and conveying in step (b) the 2D images to the video monitor.

6. The filmless single-stage printing method of claim 1, wherein said video monitor comprises a color video monitor for displaying 2D images in color on said screen of said monitor.

7. The filmless single-stage printing method of claim 1, wherein said video monitor comprises a black-and-white video monitor for sequentially displaying three color component images on said monitor for each said 2D image at each projection angle.

8. The filmless single-stage printing method of claim 7, which further comprises a color filter assembly containing three separate filters of primary colors for filtering respective color component images for projecting said component images onto said lenticular print material in step (c).

9. The filmless single-stage printing method of claim 2, wherein the scene is intermittently rotated to allow the 2D images of different views of said scene to be captured by said video camera in a discrete sequence.

10. The filmless single-stage printing method of claim 2, wherein the scene is continuously rotated to allow the 2D images of different views of said scene to be captured by said video camera in a continuous sequence.

11. The filmless single-stage printing method of claim 1, in which the plurality of 2D views of a scene is electronically captured in step (a) by aiming the video camera at an object in a scene which it is desired to print onto a 3D photograph, said aiming being performed to keep the object in proper registration for subsequent printing of the 3D photograph, said video camera acquiring 2D images of a scene at different viewing angles while maintaining the video camera in a stationary position while the scene is rotated in the desired direction in order to allow the 2D images of different views of said scene to be captured in proper sequence, said relative movement of the scene in relation to the video camera automatically maintaining the object in proper registration.

12. The filmless single-stage printing method of claim 2, wherein the video camera captures the 2D images through a plane mirror.

13. The filmless single-stage printing method of claim 1, wherein the electronic conveying means of step (b) comprises a data transmitter and a data receiver wherein the 2D images are conveyed to the video monitor via said data transmitter and data receiver.

14. The filmless single-stage printing method of claim 1 in which the plurality of 2D views of a scene at different viewing angles are generated in a computer with a selected object of said scene being kept in proper registration during the generation of the computer views which are electronically captured in the computer in step (a).

15. The filmless single-stage printing method of claim 14, further comprising storing the captured 2D images generated by the computer in an electronic storage device and retrieving said 2D images from the electronic storage device and electronically conveying the 2D images to the video monitor.

16. The filmless single-stage printing method of claim 14, wherein the electronic conveying means of step (b) is a data transmitter and a data receiver for electronically conveying said 2D image to the video monitor.

17. The filmless single-stage printing method of claim 1 in which the electronic capturing means comprises a video camera and a computer for generating 2D images of different views of a scene, wherein (a) a plurality of 2D views of a scene is electronically captured in step (a) of claim 1 by aiming a video camera at an object in a scene which it is desired to print onto a 3D photograph, said aiming being performed to keep the object in proper registration for subsequent printing of the 3D photograph, said video camera acquiring 2D images of a scene at different viewing angles by moving said video camera relative to the object while said video camera is being aimed at said object, said aiming and relative moving of said video camera automatically maintaining the object in proper registration;

(b) generating 2D images of different views of a scene in a computer, with a selected object in a scene being kept in proper registration; and (c) electronically transferring said computer generated 2D images and images captured by the video camera to an image processing device for processing and correlating said 2D images prior to electronically conveying the images to a video monitor in step (b) of claim 1.

18. The filmless single-stage priming method of claim 1, wherein the said 2D image of a view of a scene as displayed has a horizontal axis and a vertical axis, wherein the vertical axis of said 2D image as displayed is substantially perpendicular to the longitudinal axes of the lenticules of said lenticular print material.

19. The filmless single-stage printing method of claim 1, wherein said 2D image of a view of a scene as displayed has a horizontal axis and a vertical axis, wherein the vertical axis of said 2D image as displayed is substantially parallel to the longitudinal axes of the lenticules of said lenticular print material.

20. A filmless single-stage printing method for printing 3D pictures from a plurality of electronically captured and computer generated 2D images of different scenes on lenticular print material having a multiplicity of lenticules, each lenticule having longitudinal axis and horizontal axis, said method comprising the steps of:

(a) electronically capturing the 2D images of some of said scenes by electronic capturing means;

(b) electronically generating the 2D images of other scenes by a computer;

(c) electronically combining said captured 2D images and said computer generated 2D images of said other scenes thereby producing a plurality of combined 2D images;

(d) conveying said combined 2D images by electronic conveying means to a single video monitor with a screen for sequentially displaying said combined 2D images on said screen;

(e) projecting said displayed 2D images for exposing said 2D images onto lenticular print material through a projection lens which is focused on said screen and on said lenticular print material at the desired locations; and (f) moving the group of elements comprising (i) said projection lens and (ii) said lenticular print material in the same direction to different positions in relation to said screen of said video monitor for exposing said displayed 2D images onto said print material at the desired locations at different projection angles while maintaining said projection lens in proper focus on said screen and said lenticular print material, said moving direction being perpendicular to the longitudinal axis of the lenticules of said lenticular print material.

21. The single-stage printing method of claim 20, wherein said 2D image of a view of the scene has a vertical axis and a horizontal axis, wherein the vertical axis of said 2D image as displayed is substantially parallel to the longitudinal axes of the lenticules of said lenticular print material.

22. The single-stage printing method of claim 20, wherein said 2D image of a view of the scene has a vertical axis and a horizontal axis, wherein the vertical axis of said 2D image as displayed is substantially parallel to the transverse axis of the lenticules of said lenticular print material.

23. A 3D photograph produced by the filmless single stage printing method of claim 10, said 3D photograph having a plurality of lenticules and a plurality of image bands within each lenticule, with a plurality of slightly different images being acquired and printed in each image band so as to minimize jumping when an observer changes the viewing angle of the view of the photograph.

24. A 3D photograph produced by the filmless single-stage printing method of claim 17, said 3D photograph having a plurality of lenticules and a plurality of image bands within each lenticule, with a plurality of slightly different images being acquired and printed in each image band so to minimize jumping when an observer changes the viewing angle of the view of the photograph.

* * * * *

UNITED STATES PATENT AND TRADEMARK OFFICE
CERTIFICATE OF CORRECTION

PATENT NO. : 5,583,971

DATED : 10 December 1996

INVENTOR(S) : Allen K. Wah Lo

It is certified that error appears in the above-identified patent and said Letters Patent is hereby corrected as shown below:

Column 6, line 48, change "pit" to --print--.
Column 6, line 62, change "priming" to --printing--.

Signed and Sealed this

Ninth Day of December, 1997

*ttest:*

BRUCE LEHMAN